(12) United States Patent
Fuechtling et al.

(10) Patent No.: US 10,575,467 B2
(45) Date of Patent: Mar. 3, 2020

(54) AGRICULTURAL HEADER

(71) Applicant: CLAAS Selbstfahrende Erntemaschinen GmbH, Harsewinkel (DE)

(72) Inventors: Christian Fuechtling, Drensteinfurt (DE); Thomas Hinz, Harsewinkel (DE); Mathieu Koehler, Harsewinkel (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 56 days.

(21) Appl. No.: 15/980,134

(22) Filed: May 15, 2018

(65) Prior Publication Data

US 2018/0332772 A1 Nov. 22, 2018

(30) Foreign Application Priority Data

May 22, 2017 (DE) .......................... 10 2017 111 060

(51) Int. Cl.
*A01D 61/02* (2006.01)
*A01D 61/00* (2006.01)
(Continued)

(52) U.S. Cl.
CPC ............. *A01D 61/02* (2013.01); *A01D 34/04* (2013.01); *A01D 34/14* (2013.01); *A01D 41/14* (2013.01);
(Continued)

(58) Field of Classification Search
CPC ........ A01D 61/02; A01D 34/04; A01D 34/14; A01D 61/002; A01D 57/20; A01D 41/14;
(Continued)

(56) References Cited

U.S. PATENT DOCUMENTS 2,302,656 A * 11/1942 Dray .................... A01D 61/008
198/814
3,921,793 A 11/1975 Hutchinson et al.
(Continued)

FOREIGN PATENT DOCUMENTS

EP 2586288 5/2013
WO 2011/108984 A1 9/2011

OTHER PUBLICATIONS

European Search Report dated Oct. 9, 2018 in European Application No. .EP 18 16 0399 with English translation of the relevant parts.

Primary Examiner — Arpad Fabian-Kovacs
(74) Attorney, Agent, or Firm — Collard & Roe, P.C.

(57) ABSTRACT

A header has a middle section disposed on a main frame and at least two side sections disposed adjacent to the middle section, a cutterbar extending substantially across the width of the header, and at least one conveyor device which conveys crop cut by the cutterbar laterally in the direction of the middle section. The conveyor device has a central conveyor including an endlessly circulating, endless conveyor belt which is guided around two rollers disposed on two support elements extending in parallel to the conveyance direction and are each mounted on bearing points provided on the support elements. The support elements each have a guide recess and in which one of the rollers is displaceable so that the conveyor belt can be transferred from an operating position, in which the conveyor belt is tensioned, into a maintenance position, in which the conveyor belt sags, in sections, in the vertical direction.

9 Claims, 5 Drawing Sheets (51) Int. Cl.
*A01D 34/14* (2006.01)
*A01D 34/04* (2006.01)
*A01D 57/20* (2006.01)
*A01D 41/14* (2006.01)
*B65G 23/44* (2006.01)

(52) U.S. Cl.
CPC ........... *A01D 57/20* (2013.01); *A01D 61/002* (2013.01); *B65G 23/44* (2013.01)

(58) Field of Classification Search
CPC ...... A01D 61/008; A01D 43/06; B65G 23/44; B65G 15/00
See application file for complete search history.

(56) References Cited

U.S. PATENT DOCUMENTS

| | | | |
|---|---|---|---|
| 4,038,809 A * | 8/1977 | Arnould | A01D 57/20 56/124 |
| 4,362,005 A * | 12/1982 | Hanaway | A01D 41/14 198/814 |
| 4,369,617 A * | 1/1983 | Hanaway | A01D 61/008 198/814 |
| 5,022,514 A * | 6/1991 | Lofberg | B65G 15/00 198/813 |
| 5,030,173 A * | 7/1991 | Bryant | B65G 23/44 474/136 |
| 6,116,008 A * | 9/2000 | Digman | A01D 41/16 56/15.8 |
| 6,161,683 A | 12/2000 | Wallis | |
| 6,202,397 B1 | 3/2001 | Watts et al. | |
| 8,544,250 B2 | 10/2013 | Lovett et al. | |
| 10,264,728 B2 * | 4/2019 | Brimeyer | A01D 61/02 |
| 10,264,729 B1 * | 4/2019 | Schuler | A01D 61/02 |
| 2005/0022491 A1 * | 2/2005 | Zurn | A01D 57/20 56/16.4 R |
| 2007/0193243 A1 * | 8/2007 | Schmidt | A01D 41/14 56/181 |
| 2008/0271426 A1 * | 11/2008 | Lohrentz | A01D 41/14 56/153 |
| 2008/0276590 A1 * | 11/2008 | Sauerwein | A01D 41/14 56/153 |
| 2013/0105282 A1 * | 5/2013 | Hoffman | A01D 41/14 198/814 |

* cited by examiner

AGRICULTURAL HEADER

CROSS-REFERENCE TO RELATED APPLICATIONS

This application claims priority under 35 USC 119 of German Patent Application No. 10 2017 111060.7, filed on May 22, 2017, the disclosure of which is herein incorporated by reference.

BACKGROUND OF THE INVENTION

The present invention relates to a header comprising a middle section disposed on a main frame and at least two side sections disposed adjacent to the middle section, a cutterbar extending substantially across the width of the header, and at least one conveyor device which conveys crop cut by the cutterbar laterally in the direction of the middle section.

Headers of this type are designed as so-called belt cutting units which comprise a middle section disposed on a main frame and at least two side sections disposed adjacent to the middle section. A cutterbar extending substantially across the width of the header cuts crop. The header conveys crop cut by the cutterbar laterally in the direction of the middle section by means of a conveyor device. The middle section comprises at least one endless conveyor belt which endlessly circulates transversely to the conveyance direction of the conveyor device and is guided around two rollers spaced apart from each other. The rollers are disposed between support elements extending in parallel to each other in the conveyance direction of the conveyor belt and are mounted between bearing points provided on each of the support elements.

Such headers are distinguished by a high degree of flexibility in the adaptation to a ground contour of an area to be worked. The conveyor belt of the middle section, which is guided around the rollers, is connected by means of a connector in order to form an endlessly circulating conveyor belt. The connector consists of two square tubes which clamp the two belt ends together by means of screws. The disadvantage of this connecting point is that the conveyor belt is stiffened, in the circumferential direction, across a large area. As a result, the belt run becomes choppy as soon as this area passes by the particular roller. In order to achieve a smoother belt run, the diameter of the rollers is selected to be larger. This is disadvantageous, however, when the smallest possible distance is to be achieved between the roller and the cutterbar in order to obtain the most compact design of the middle section possible. A small distance from the roller to the cutterbar assists the crop flow, specifically during the harvesting of short crops with low yield.

In addition, the connecting point comprising the two square tubes has yet another disadvantage. The connecting point interrupts the conveyor belt and forms a breaking point which tends to fatigue, and this often occurs before the lifetime of the conveyor belt has been reached. The presence of the connecting point is due to the structural configuration of the middle section which does not allow for the installation of a conveyor belt without a connecting point. This similarly applies for the disassembly and the subsequent service of the conveyor belt for maintenance and cleaning purposes. Frequently, the interior of the conveyor belt can be reached, in order to carry out maintenance or cleaning work, only by separating the connecting point.

EP 2 586 288 B1 describes a header of the type mentioned at the outset, which comprises side sections and a middle section. The middle section comprises a central conveyor which includes an endlessly circulating, endless conveyor belt which is guided around two rollers which are spaced apart from each other, are disposed on two support elements extending in parallel to the conveyance direction of the conveyor belt, and are mounted on bearing points provided on each of the support elements. A belt tensioning device is disposed between the conveyor belt, with the aid of which an opposing pushing force is applied to the two rollers. For assembly and disassembly, it is provided that the central conveyor is articulated, on one side, on a support element so as to be swivelable about a horizontal axis and, on the other side, is detachably disposed on the other support element, and therefore the central conveyor can be swiveled downward, in sections. The swivel path is dimensioned in such a way that, in this position of the central conveyor, the endless conveyor belt can be removed from the rollers in a direction extending in parallel to the rollers. In this embodiment of the central conveyor, it has proven disadvantageous that the accessibility is extremely limited, in particular in the inner area of the conveyor belt and in the area of the support element on which the central conveyor is swivelably articulated. In order to also be able to reach the areas of the support element, on which the central conveyor is swivelably articulated, for cleaning purposes, the conveyor belt must be removed and subsequently slid back on, which is time-consuming.

SUMMARY OF THE INVENTION

The problem addressed by the present invention is therefore that of refining a header of the type mentioned at the outset, which is distinguished by improved serviceability and ease of assembly.

This problem is solved according to the invention by a header which comprises a middle section disposed on a main frame and at least two side sections disposed adjacent to the middle section, a cutterbar extending substantially across the width of the header, and at least one conveyor device which conveys crop cut by the cutterbar laterally in the direction of the middle section. The conveyor device comprises a central conveyor including an endlessly circulating, endless conveyor belt which is guided around two rollers which are spaced apart from each other, are disposed on two support elements extending in parallel to the conveyance direction of the conveyor belt, and are mounted on bearing points provided on each of the support elements.

The support elements each comprise a guide recess extending in the longitudinal direction of the support element and in which one of the rollers is displaceable, in sections, in the longitudinal direction of the support elements, and therefore the conveyor belt can be transferred from an operating position, in which the conveyor belt is tensioned, into a maintenance position, in which the conveyor belt sags, in sections, in the vertical direction. The guide recesses are disposed opposite each other at one end of the support elements.

Due to the possibility of moving one of the rollers toward the other roller, the belt can be transferred into a maintenance position. This makes it easy to access the area between the conveyor belt and the areas adjacent to the rollers, in order to be able to perform necessary maintenance and cleaning work. In contrast to the related art, a disassembly and assembly of the conveyor belt for cleaning purposes is not required.

For this purpose, sections of the conveyor belt, in its maintenance position, can protrude through an opening which can be exposed on the underside of the header. The belt interior, in particular, can be reached quickly through this opening for cleaning purposes. The duration of any interruptions during a harvesting operation can therefore be substantially reduced.

It is advantageous when at least one maintenance flap is articulated on the middle section on the underside of the header, the maintenance flap being swivelable about an axis extending in parallel to the rollers.

In this case, the at least one maintenance flap should have a width which is greater than the distance between the two support elements. As a result, a sufficient accessibility for maintenance and cleaning purposes is ensured.

In particular, the at least one maintenance flap can be articulated adjacent to the cutterbar. The at least one maintenance flap can therefore swivel outward in the direction of the cutterbar. Locking means, which are required for locking the at least one maintenance flap, are preferably disposed in the rear area of the header, where more installation space is available.

According to one refinement, it can be provided that the bearing points are designed as bearing units detachably disposed on the two support elements, and therefore the conveyor belt and the rollers can be jointly removed from the underside of the header, in the position in which the bearing units are detached from the support elements. As a result, a rapid and uncomplicated replacement of the conveyor belt is made possible. Due to the selected minimum width of the maintenance flap, the particular bearing units can be removed laterally from the rollers.

It is advantageous when the displaceable roller can be transferred from the operating position into the maintenance position, and vice versa, by means of a tensioning device disposed on the bearing points, on both sides. The tensioning devices therefore have two tasks. On the one hand, the tensioning devices are used for generating and maintaining the necessary belt tension. On the other hand, each of the tensioning devices forms an actuating element, in order to transfer the displaceable roller from the operating position into the maintenance position, and vice versa.

For this purpose, the particular tensioning device can be designed as a toggle joint arrangement which is detachably disposed on the particular support element, on the outside. The toggle joint arrangement is easily accessible due to its arrangement on the outside and due to the minimum width of the maintenance flap. Due to the arrangement of the tensioning devices on the outside, in contrast to the related art, the interior of the conveyor belt is fully accessible.

In particular, the respective tensioning device can comprise a sliding unit, which is displaceable in the longitudinal direction of the support element and on which the particular bearing unit of the roller—which is displaceable by means of the tensioning device—is fastened. Therefore, the amount of effort and complexity involved in replacing the conveyor belt can be reduced, in that the bearing units of the displaceable roller can be removed and installed jointly with the sliding elements of the tensioning device. The bearing units of the fixedly disposed roller are each disposed on the support elements by means of a fastening section. Screw connections can be provided as a detachable connection for fastening the sliding units and the fastening sections.

Preferably, the roller disposed adjacent to the cutterbar can have a smaller outer diameter than the roller spaced farther away from the cutterbar. As a result, the overall height of the central conveyor can be minimized in the area behind the cutterbar, which is sensitive for the crop intake, thereby preventing crop deposits. In addition, the distance between the cutterbar and the conveyor belt of the central conveyor can be reduced, thereby improving the crop intake in this area.

In addition, the roller disposed adjacent to the cutterbar can be designed as a guide roller, and the roller spaced farther away from the cutterbar can be designed as a drive roller.

BRIEF DESCRIPTION OF THE DRAWINGS

The present invention is described in greater detail in the following with reference to an exemplary embodiment depicted in the drawings.

In the drawings.

DETAILED DESCRIPTION OF THE EMBODIMENTS

Figure 1:
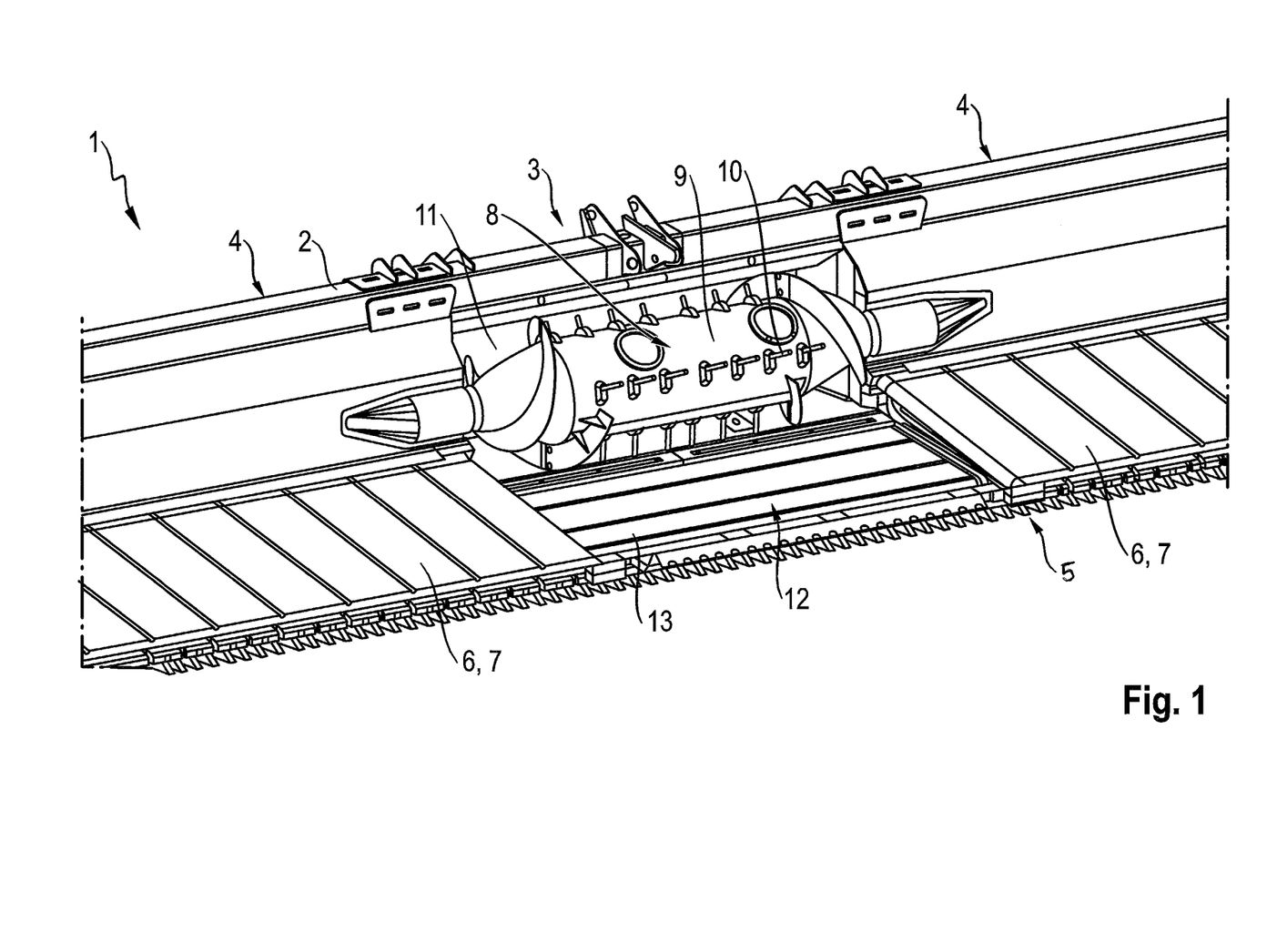
FIG. 1 shows a perspective view of a schematic partial depiction of a header.

FIG. 1 shows a perspective view of a schematic partial depiction of a header 1. The header 1 is designed as a so-called belt cutting unit which is distinguished by a high degree of flexibility in the adaptation to a ground contour of an area to be worked or harvested. The header 1 comprises a main frame 2 on which a middle section 3 and at least two side sections 4 adjacent to the middle section 3 are disposed. A cutterbar 5, which extends substantially across the entire width of the header 1, is disposed on the middle section 3 and the side sections 4 on the front side opposite the main frame 2. In addition, non-illustrated reels are disposed on the main frame 2 of the header 1, which extend across the width of one side section 4 and partially across the width of the middle section 3. The reels are used to improve the intake of the crop by the cutterbar 5.

The crop cut by the cutterbar 5 is fed to a conveyor device 6 disposed behind the cutterbar 5, the conveyor device 6 comprising at least one endlessly circulating lateral conveyor belt 7 on the respective side sections 4. The endlessly circulating lateral conveyor belts 7 are disposed adjacent to the middle section 3 in order to convey the crop cut by the cutterbar 5 in parallel to the longitudinal axis of header 1 in the direction of middle section 3. In the area of the middle section 3, the crop is fed to an intake conveyor device 8. The intake conveyor device 8 is designed as a drivable feed roller 9 which is mounted on the main frame 2 by means of frame elements. The feed roller 9 comprises retractable fingers 10. The intake conveyor device 8 conveys the crop, which has been delivered laterally to the middle section 3 by the endless lateral conveyor belts 7, to an opening 11 which is provided in the main frame 2 and is disposed behind the feed roller 9, through which opening the cut crop is transferred— via a feeder housing (not shown) of a combine harvester, to which the header 1 can be fastened—to the combine harvester for further processing. The middle section 3 comprises a central conveyor 12 which includes at least one endlessly circulating conveyor belt 13.

Figure 2:
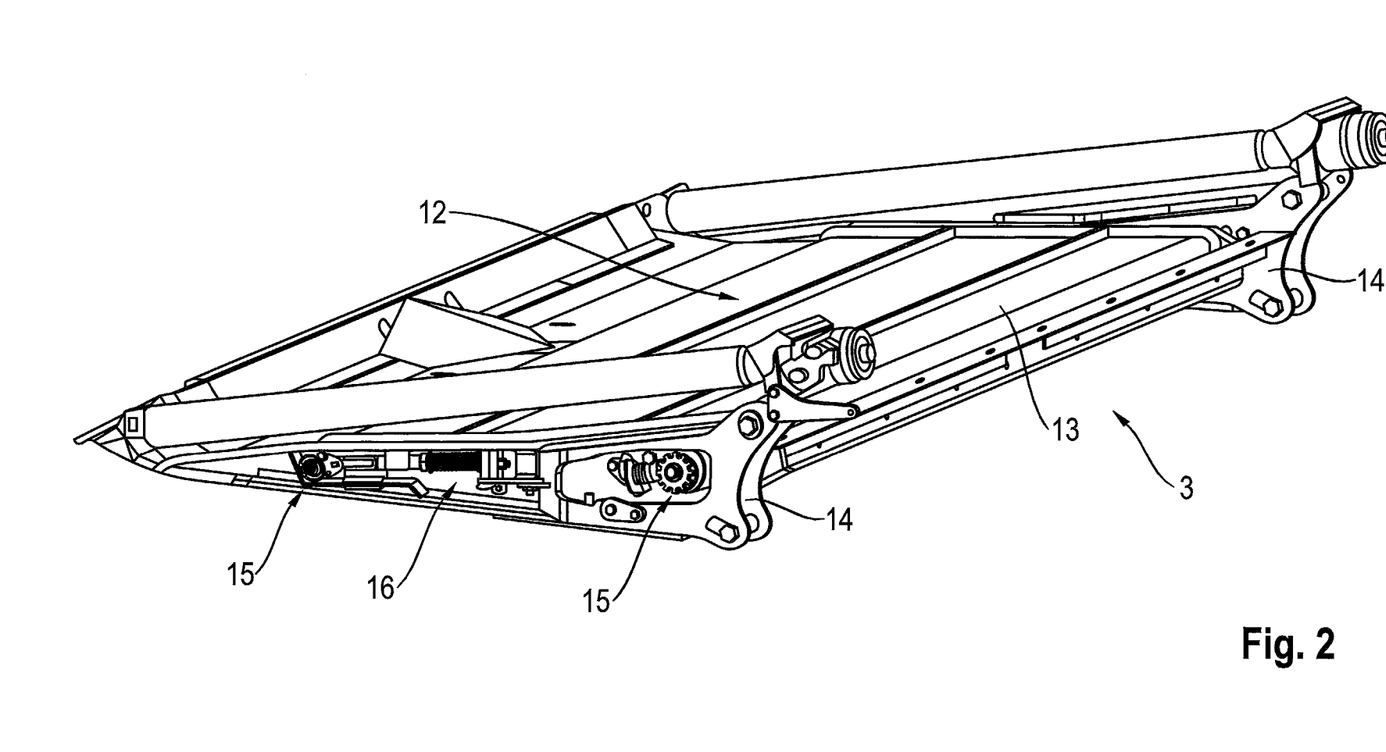
FIG. 2 shows a perspective view of a schematic representation of a middle section.

FIG. 2 shows a perspective view of a schematic representation of a middle section 3. The conveyor belt 13 is designed to be endless, i.e., it comprises no connecting point for detachably connecting two ends of the conveyor belt. The central conveyor 12 is disposed on support elements 14 extending in parallel to the conveyance of the conveyor belt 13. For this purpose, bearing points 15 are provided at the ends of the particular support element 14, which are used for mounting a roller 24b designed as a drive roller as well as a roller 24a designed as a guide roller, as represented in FIG. 4. The rollers 24a, 24b are disposed between the support elements 14. The conveyor belt 13 of the central conveyor 12 endlessly circulates around these rollers 24a, 24b. In addition, the representation in FIG. 2 shows one of two tensioning devices 16, each of which is disposed on the support elements 14 on the outside, i.e., on the sides facing away from the conveyor belt 13. The tensioning device 16 is designed as a toggle joint arrangement in each case, which is described in greater detail in the following with reference to FIG. 3.

Figure 3:
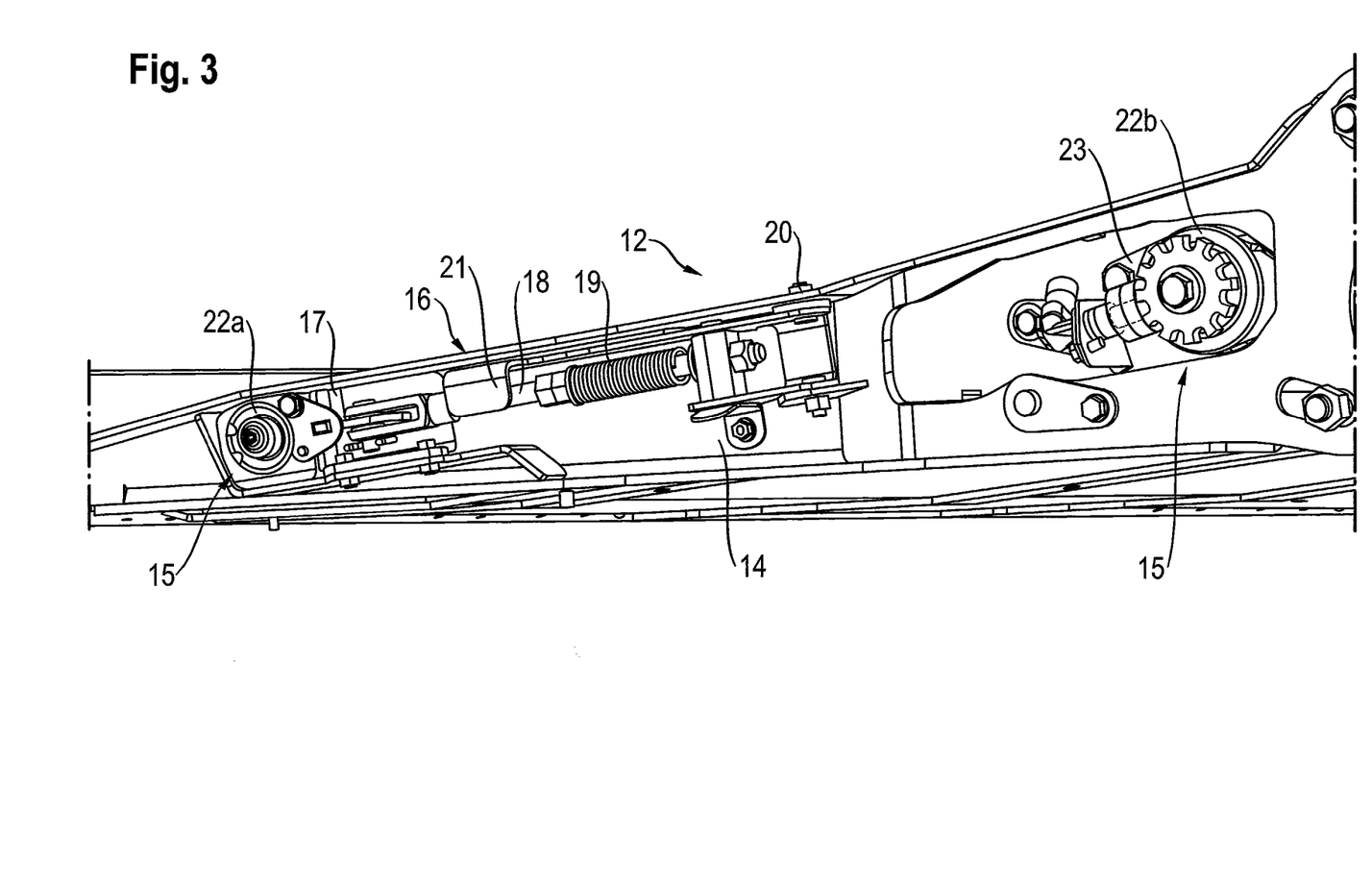
FIG. 3 shows a partial view of a support element of the middle section according to FIG. 2.
Figure 4:
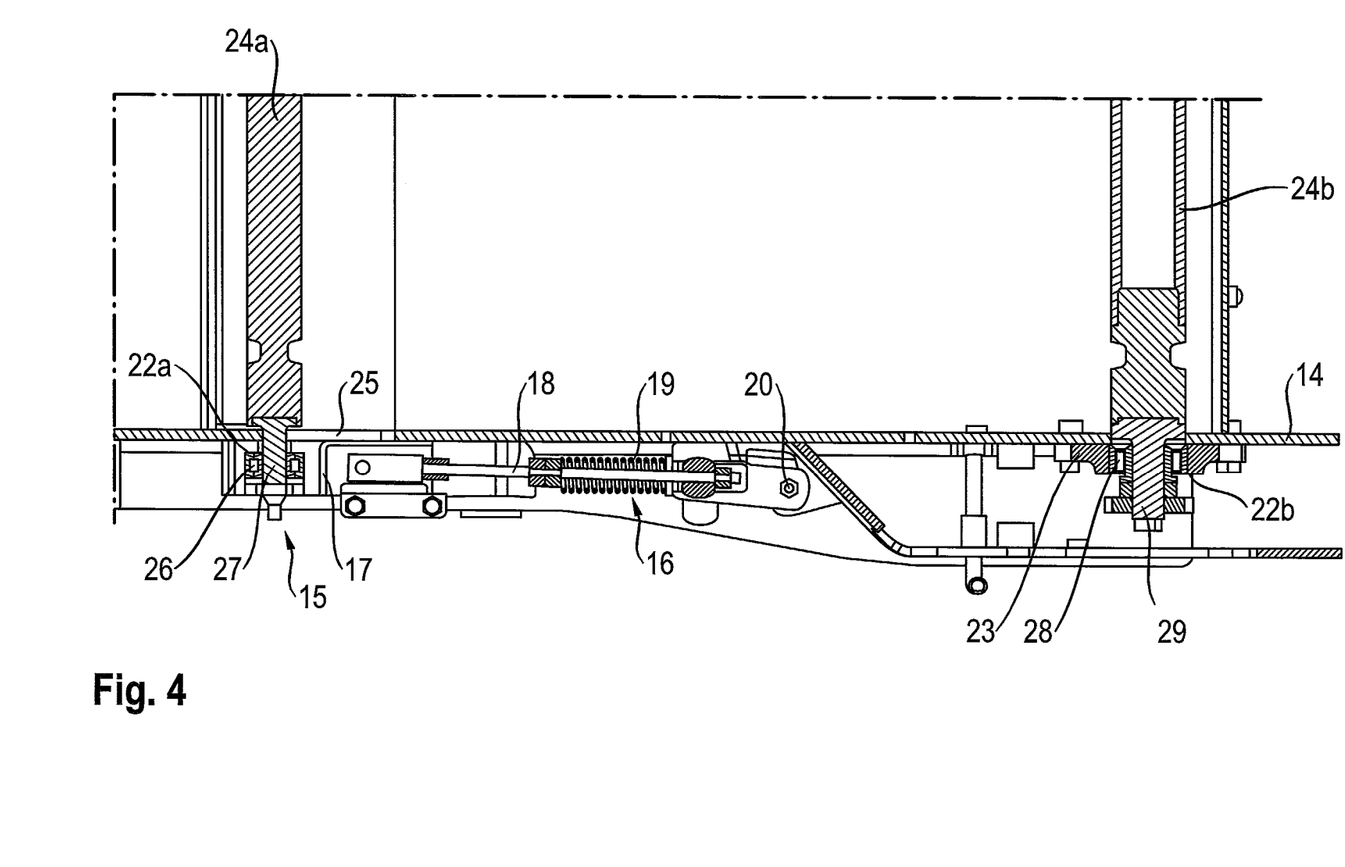
FIG. 4 shows a partial view of the middle section in a view from above.

FIG. 3 shows a partial view of one of the support elements 14 of the middle section 3 according to FIG. 2. The support elements 14 of the middle section 3 are designed as mirror images of each other. All components of the support element 14 represented in FIG. 3 and described in the following are also located on the support element (not shown) of the middle section 3. The tensioning device 16 comprises a sliding unit 17, a coupling rod 18 articulated thereon, a compression spring 19 being disposed on the coupling rod, and a toggle joint, 21 disposed so as to be swivelable about a rotation point 20. Disposed on the sliding unit 17 is a front bearing unit 22a which is used for the rotatable mounting of the roller 24a designed as a guide roller. The front bearing unit 22a is displaceable jointly with the sliding unit 17 in the longitudinal direction of the support element 14. Provided on the opposite end of the support element 14 is a rear bearing unit 22b which is detachably fastened to the support element 14 by means of a flange-shaped fastening section 23. The rear bearing unit 22b is used for the rotatable mounting of the roller 24b designed as a drive roller.

FIG. 4 shows a partial view of the middle section 3, in a view from above. In this case, the representation of the conveyor belt 13 was dispensed with, for the sake of improved clarity.

The front bearing unit 22a disposed in the sliding unit 17 comprises a rolling bearing 20, in which a shaft segment 27 is rotatably mounted. The shaft segment 27 is detachably connected to the roller 24a. The shaft segment 27 extends through a guide recess 25 in the support element 14. The guide recess 25 extends, in sections, in the longitudinal direction of the support element 14. The rear bearing unit 22b also comprises a rolling bearing 28 and a shaft segment 29 rotatably mounted therein. The shaft segment 29 is detachably connected to the roller 24b.

The rear bearing units 22b, together with the fastening section 23, are detachable from the particular support element 14. In order to detach the front bearing units 22a, it is provided that the particular tensioning device 16, together with the bearing unit 22a disposed thereon, is detached from the particular support element 14. Preferably, the fastening sections 23 and the tensioning devices 16 are connected to the support elements 14 by means of screw connections.

Figure 5:
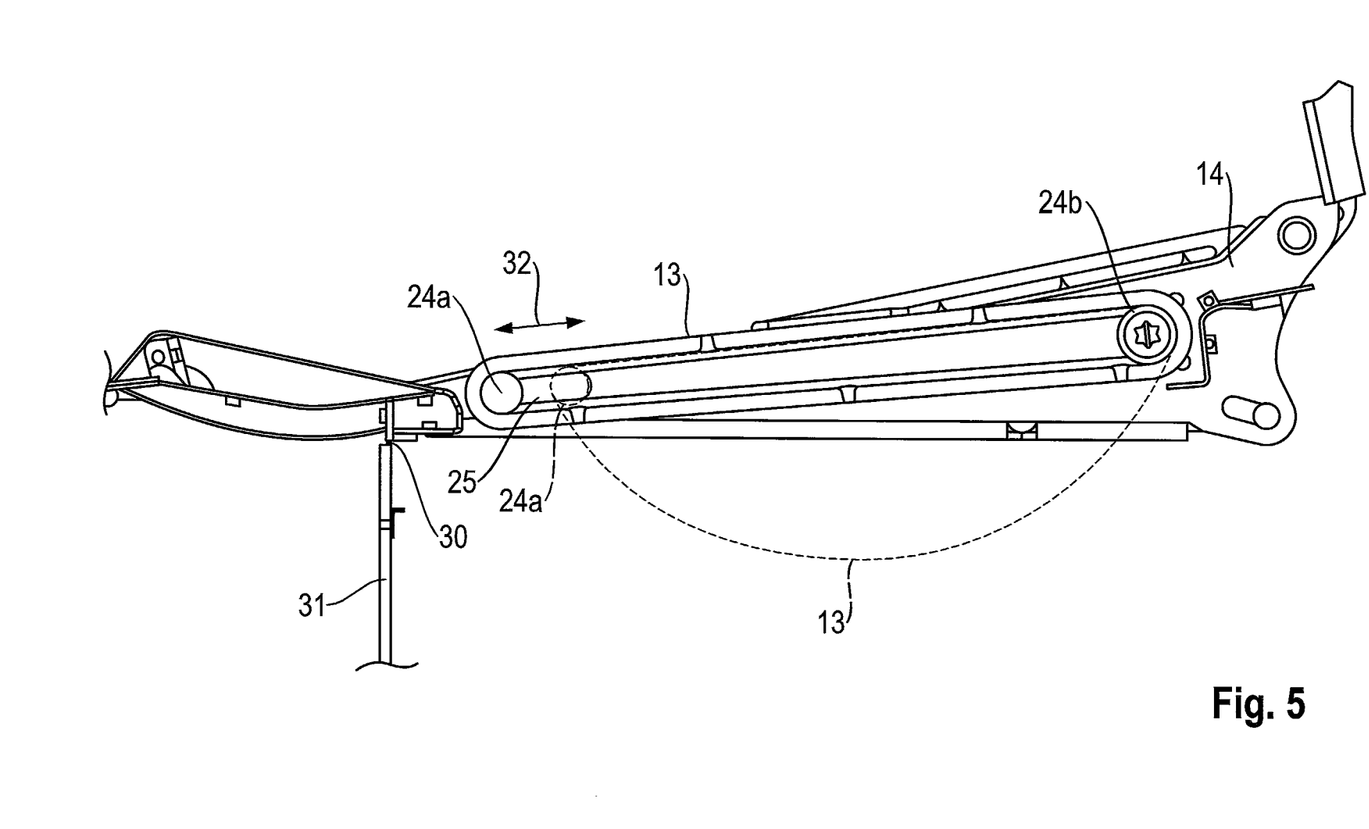
FIG. 5 shows a schematic side view of the middle section.

The representation in FIG. 5 shows a schematic side view of the middle section 3. The middle section 3 comprises a maintenance flap 31 which is disposed on the underside of the middle section so as to be swivelable about an axis 30. The axis 30 is preferably disposed on the side of the middle section 3 facing the cutterbar 5. The maintenance flap 31 can be locked in the closed position by means of a locking means, which is not represented in greater detail, and therefore the maintenance flap 31 extends substantially in parallel to the underside of the middle section 3. The width of the maintenance flap 31 corresponds at least to the distance between the two support elements 14.

The representation in FIG. 5 shows the maintenance flap 31 in the open position. In the open position of the maintenance flap 31, the middle section 3 is accessible from below. As described above, the roller 24a is displaceable within the guide recess 25 in the longitudinal direction of the support element 14. An arrow 32 marks the direction of motion of the roller 24a. The conveyor belt 13 is represented in its tensioned operating position and, by means of dashed lines, in its maintenance position, in which the conveyor belt 13 sags, in sections, in the vertical direction. In order to transfer the conveyor belt 13 into the maintenance position, the roller 24a is displaced, in sections, in the direction of the roller 24b by means of the tensioning devices 16 which are disposed on the support elements 14, on both sides. The actuation of the toggle joint 20 for releasing the tension of the conveyor belt 13 transfers the sliding unit 17 in the direction of the arrow 32 into a position which is spaced farther from the cutterbar 5. In this case, the roller 24a, together with the bearing units 22a, is guided by the sliding unit 17 within the guide recesses 25. The length of the guide recesses 25 is dimensioned in such a way that the conveyor belt 13 is not merely relaxed, it also protrudes substantially beyond the underside of the middle section 3 when the maintenance flap 31 is open.

The tensioning devices 16 and the bearing units 22b can be removed, laterally, when the maintenance flap 21 is in the open position. By detaching the front and rear bearing units 22a and 22b, the conveyor belt 13, together with the rollers 24a and 24b, can be removed through the opening on the underside of the middle section 3, which was exposed by the maintenance flap 31.

LIST OF REFERENCE SIGNS 1 header
2 main frame
3 middle section
4 side section
5 cutterbar
6 conveyor device
7 lateral conveyor belt
8 intake conveyor device
9 feed roller
10 finger
11 opening
12 central conveyor
13 conveyor belt
14 support element
15 bearing point
16 tensioning device
17 sliding unit
18 coupling rod
19 compression spring
20 rotation point
21 toggle joint
22a front bearing unit
22b rear bearing unit
23 fastening section
24a roller
24b roller
25 guide recess
26 rolling bearing
27 shaft segment 28 rolling bearing
29 shaft segment
30 axis
31 maintenance flap
32 arrow

What is claimed is:

1. A header comprising:

a main frame;

a middle section disposed on the main frame;

at least two side sections disposed adjacent to the middle section;

a cutterbar extending substantially across a width of the header, and at least one conveyor device configured for conveying crop cut by the cutterbar laterally in a direction toward the middle section, said conveyor device comprising a central conveyor including an endlessly circulating, endless conveyor belt which is guided around two rollers which are spaced apart from each other, wherein said rollers are disposed on two support elements extending in parallel to a conveyance direction of the conveyor belt and are mounted on bearing points provided on each of the support elements, wherein the support elements each comprise a guide recess extending in a longitudinal direction of the respective support element and in which recess one of the rollers is displaceable, in sections, in the longitudinal direction of the support element, such that the conveyor belt can be transferred from an operating position, in which the conveyor belt is tensioned, into a maintenance position, in which the conveyor belt sags, in sections, in a vertical direction, wherein in the maintenance position, sections of the conveyor belt protrude through an exposable opening in an underside of the header, and wherein at least one maintenance flap is articulated on the middle section on the underside of the header, the maintenance flap being swivelable about an axis extending in parallel to the rollers.

2. The header as claimed in claim 1, wherein the at least one maintenance flap has a width which is greater than a distance between the two support elements.

3. The header as claimed in claim 1, wherein the at least one maintenance flap is articulated adjacent to the cutterbar.

4. The header as claimed in claim 1, wherein the bearing points are designed as bearing units detachably disposed on the two support elements such that the conveyor belt and the rollers can be jointly removed from the underside of the header by detaching the bearing units from the support elements.

5. The header as claimed in claim 4, further comprising a tensioning device disposed on the bearing points of each of the support elements, said tensioning device being configured for transferring the displaceable roller from the operating position into the maintenance position, and vice versa.

6. The header as claimed in claim 5, wherein the tensioning device is designed as a toggle joint arrangement which is detachably disposed an outside of the respective support element.

7. The header as claimed in claim 6, wherein the tensioning device comprises a sliding unit which is displaceable in the longitudinal direction of the respective support element and on which the particular bearing unit of the displaceable roller is fastened.

8. The header as claimed in claim 1, wherein the roller disposed adjacent to the cutterbar has a smaller outer diameter than the roller spaced farther away from the cutterbar.

9. The header as claimed in claim 1, wherein the roller disposed adjacent to the cutterbar is designed as a guide roller and the roller spaced farther away from the cutterbar is designed as a drive roller.

* * * * *